United States Patent [19]

Spencer et al.

[11] E Re. 30,020

[45] Reissued Jun. 5, 1979

[54] FOLDABLE WORK PLATFORM

[75] Inventors: Edward Spencer, La Grange, Ill.; Harold R. Wing, Springville, Utah

[73] Assignee: Little Giant Industries Inc., American Fork, Utah

[21] Appl. No.: 903,361

[22] Filed: May 5, 1978

Related U.S. Patent Documents

Reissue of:

[64] Patent No.: 4,031,981
Issued: Jun. 28, 1977
Appl. No.: 691,926
Filed: Jun. 1, 1976

[51] Int. Cl.[2] ..... E04G 1/32; F16M 11/00

[52] U.S. Cl. ..... 182/153; 182/182; 182/227; 248/167; 248/188.6

[58] Field of Search ..... 182/153, 154, 181, 182, 182/183, 184, 185, 186, 224, 225, 226, 227; 248/188.6, 167, 436; 269/296

[56] References Cited

U.S. PATENT DOCUMENTS

| | | | |
|---|---|---|---|
| 358,836 | 3/1887 | Casler | 248/167 |
| 850,351 | 4/1907 | Crum | 182/153 |
| 1,159,299 | 11/1915 | Van Huzer | 182/153 |
| 1,450,869 | 4/1923 | Reinelt | 182/153 |
| 1,547,225 | 7/1925 | Marks | 182/182 |
| 1,638,839 | 8/1927 | Farmer | 182/153 |
| 1,659,113 | 2/1928 | Marks | 182/182 |
| 2,572,205 | 10/1951 | Shanks | 248/188.6 |
| 2,572,928 | 10/1951 | Hawes | 182/182 |
| 3,934,676 | 1/1976 | Rice | 182/182 |

FOREIGN PATENT DOCUMENTS

| | | | |
|---|---|---|---|
| 327045 | 3/1930 | United Kingdom | 182/153 |

*Primary Examiner*—Reinaldo P. Machado
*Attorney, Agent, or Firm*—H. Ross Workman; Rick D. Nydegger

[57] ABSTRACT

An improved foldable work stand and platform having an upper work support surface with wooden inserts therein to protect saws and the like from being damaged by accidental contact with the metal structure of the platform. The foldable work platform also includes improved structure for elevating the working surface and an adjustable stabilizer leg to maintain the work surface generally horizontal on uneven terrain. Lateral extensions of the work surface provide versatility in the work surface configuration and are easily secured in a selected orientation.

6 Claims, 5 Drawing Figures

FOLDABLE WORK PLATFORM

Matter enclosed in heavy brackets [ ] appears in the original patent but forms no part of this reissue specification; matter printed in italics indicates the additions made by reissue.

BACKGROUND

1. Field of the Invention

The present invention relates to foldable work platforms.

2. The Prior Art

Conventional work platforms are commonly referred to as saw horses. Saw horses are commonly rigidly constructed from wood and present a wooden surface upon which boards and the like are placed for cutting and/or fabrication. Often saw horses are constructed on a job site because of their awkward shape and the attendant difficulty with which they are transported.

One of the most persistent problems, however, is the common practice of inadvertently cutting through the saw horse as boards thereon are being cut. When cut through, the saw horse is worthless and another must be constructed thereby incurring significant cost of time and materials.

Foldable work platforms for use as extensible support stands and surfaces for workpieces are known in the art. One prior art work platform is manufactured in West Germany and is sold under the trademark of WAKU and distributed by Cross State Sales, Inc. of Salt Lake City, Utah. The upper surfaces of the prior art work platform are, however, fabricated from metal stock and covered with a thin, rubberized mat surface. Experience has revealed that using a work platform with a metal surface frequently damages saws and other tools and the like when a board is accidentally cut through striking the upper metal surface of the work platform.

In view of the foregoing, it would be an advancement in the art to provide a foldable, extensible work platform which is more easily manipulated, has improved stability, and provides a surface which will not damage saws and the like if the same are accidentally brought into contact with the upper surface thereof. Such an invention is disclosed herein.

BRIEF SUMMARY AND OBJECTS OF THE INVENTION

The present invention relates to an improved metal work platform which is foldable into a generally flat configuration and includes replaceable wooden inserts for the working surfaces thereof. The wooden inserts extend above the adjacent metal parts of the platform to intercept saws or other cutting tools to prevent or at least minimize damage from accidentally striking the upper surfaces of the platform. The wooden inserts and the corresponding receiving areas of the platform are specifically designed to accommodate replacement. Novel interlock structure permits the workpiece to be secured in any one of a variety of work surface configurations.

Accordingly, it is the principal object of this invention to provide improvements in foldable work platforms.

It is another object of this invention to provide a foldable work platform with a replaceable wooden insert for the working surface thereof.

Another object of this invention is to provide improvements in the smooth operation and stability of an extensible, foldable work platform.

These and other objects and features of the present invention will become more fully apparent from the following description and appended claims taken in conjunction with the accompanying drawing.

DETAILED DESCRIPTION OF THE PREFERRED EMBODIMENTS

Figure 1:
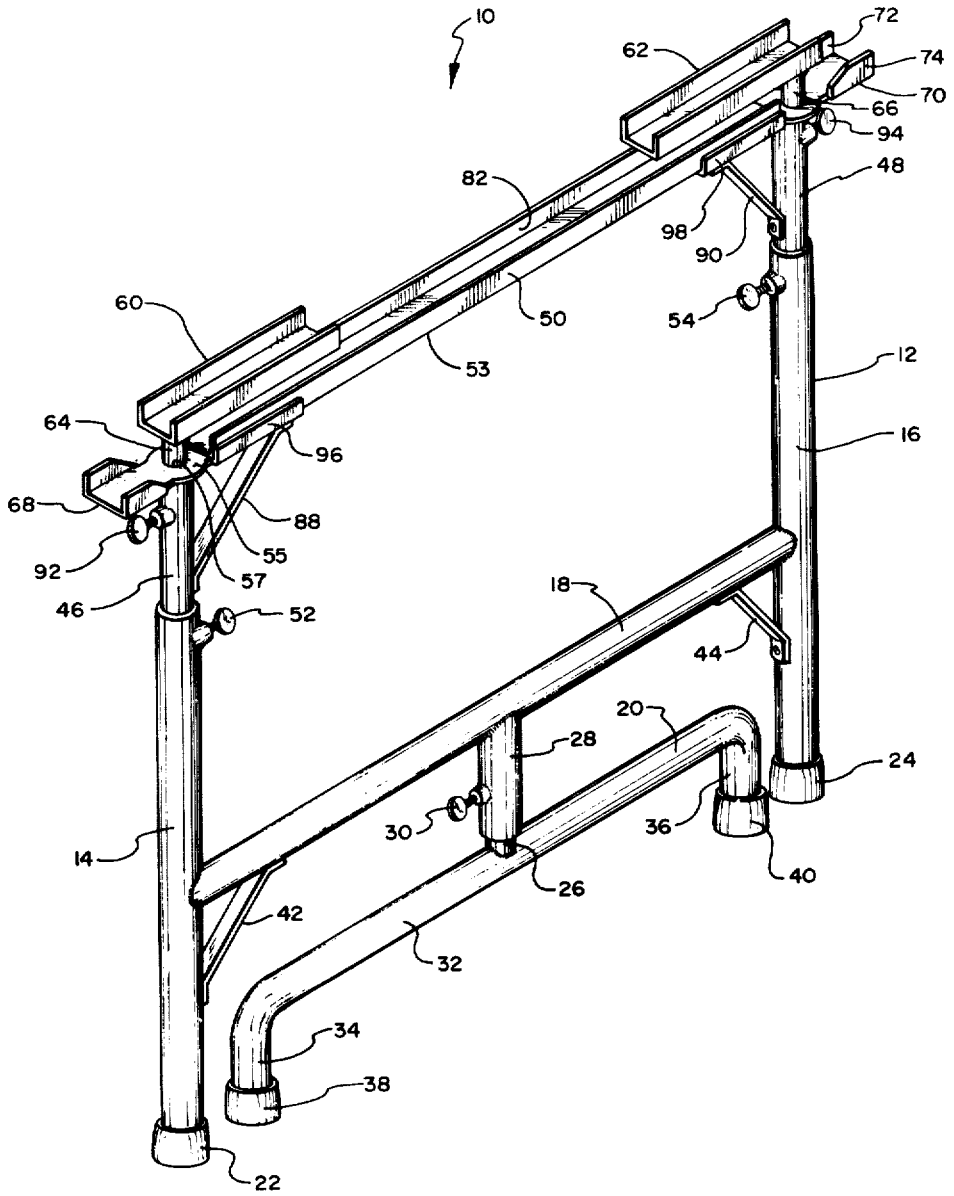
FIG. 1 is a perspective illustration of the work platform of this invention in a first, folded position, the wooden inserts having been removed to reveal underlying structure.

The invention is best understood by reference to the figures wherein like parts are designated with like numerals throughout.

Referring now to the drawing, the work platform is shown generally at 10 and includes a base 12, a support stand 20 and a scaffold 50.

Base 12 is generally configurated in the form of the letter H and includes vertical legs 14 and 16 which are formed from hollow metal tubes securely welded to a horizontal diametrally piece 18. The hollow tubes give the required strength and also give the work platform 10 a lightweight character. Lateral stability for base 12 is provided by a support stand 20 likewise formed of hollow tubular material. Support stand 20 further includes downwardly extending legs 34 and 36. Legs 34 and 36 terminate in feet 38 and 40, respectively which are preferably caps of non-skid rubber. Support stand 20 is rotatably and extensibly coupled to cross piece 18 with a hollow sleeve 28 welded or otherwise suitably permanently mounted upon cross piece 18. Hollow sleeve 28 telescopically receives a diametrically reduced neck 26 of support stand 20. The neck 26 is permanently joined to the stand 20 intermediate the length hereof and projects vertically upward. A set screw 30 is used to releasably lock the neck 26 in collar 28 and thereby accommodate setting the desired rotational position of support stand 20 with respect to base 12. It is also observed that the neck 26 is elongated to permit extension thereof out of the collar 28. Thus, on uneven terrain the stand 20 may be extended into ground engagement so that the stand 20 and one of the legs 14 or 16 will maintain the work platform 10 upright even if the other of the legs 14 or 16 does not engage the ground because of the uneven terrain.

Legs 14 and 16 terminate in a foot 22 and 24, respectively, each of which is a cap of non-skid rubber. Additional support between the legs 14 and 16 and the cross piece 18 is obtained by diagonal braces 42 and 44, respectively. The upper end of legs 14 and 16 is open to receive telescoping tubes 46 and 48 forming part of scaffold 50. The vertical height of the scaffold 50 may be adjusted by telescoping or extending the tubes 46 and 48 from the corresponding legs 14 and 16. Thumb screws 52 and 54 provide securement for the relative positions of the legs and tubes. Because the work platform may be required to support considerable weight, a positive interlock is desirable. Therefore, each tube 46 and 48 is provided with a plurality of apertures 56–58 into which thumb screws 52 and 54 advance so as to provide positive interlock between the legs 14 and 16 and corresponding tubes 46 and 48.

Scaffold 50 is constructed of a pair of support brackets 96 and 98 which are channel members opening upwardly. The tubes 46 and 48 are welded or otherwise suitably attached to the brackets 96 and 98, respectively, intermediate the length thereof. Each bracket 96 and 98 has an intermediate portion 55 from which the upstanding sides 72 and 75 of the channel member have been cut away. A through-bore 57 in the base of each bracket 96 and 98 is aligned with the corresponding tube 46 or 48 for a purpose hereinafter more fully described.

Each bracket 96 and 98 has a corresponding laterally extending support element 68 and 70 which projects beyond the legs 14 and 16 and which is separated from the remainder of the bracket 96 or 98 by intermediate portion 55. Angle braces 88 and 90 are welded or bolted between the tubes 46 and 48 to give vertical integrity to the brackets 96 and 98, respectively.

Cross channel 53 traverses the space between brackets 96 and 98 and is welded or otherwise permanently secured thereto. Cross channel 53 is configurated as an upwardly open channel having side walls 80 and 82 and in accordance with the present invention, receives a wooden insert 51 in nesting relationship, said insert 51 having a vertical dimension sufficient to extend above side walls 80 and 82 (see FIG. 3). It is presently preferred that at least half of the depth of the insert 51 project above the side walls 80 and 82. The insert 51 is illustrated as a wooden strip which is square in cross section and has a typical dimension of 2 inches (5.08 cm) square. Clearly, any suitable alternative dimensions could be used. The portion of insert 51 which is exposed above the cross channel 53 absorbs the inadvertent cuts and blows of saws or other tools and thus reduces damage to the tools which might otherwise result if the saw should strike a metal surface.

The versatility of the scaffold 50 is dramatically increased with the addition of rotatable arms 60 and 62. The arm 60 is an upwardly opening channel member having a depending shaft 64 mounted at the bottom thereof near one end. Arm 62 is similarly configurated and has a corresponding shaft 66 mounted adjacent one end thereof. Each of the shafts 64 and 66 has a substantial axial length which projects into the hollow of corresponding tubes 46 and 48. In the illustrated embodiment, the shafts 62 and 64 are rotatable within the corresponding tubes and, in addition, are telescopically extensible and retractable into and out of the corresponding tubes 46 and 48. The movability of the arms 62 and 60 permits the arms to be placed in any one of a plurality of desirable positions as illustrated in FIGS. 2–5 and as will be hereinafter more fully described. Once the position of the arms has been determined, the position is fixed by advancing thumb screws 92 and 94 through tubes 46 and 48, respectively so as to form a friction-securement of the thumb screws against the shafts 64 and 66.

Figure 4:
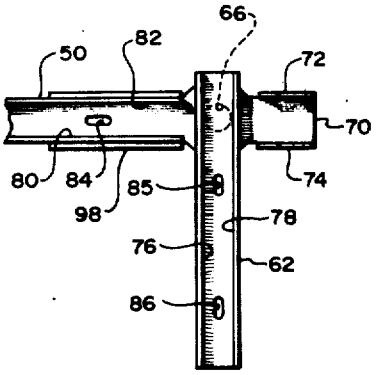
FIG. 4 is a fragmentary plan view of one portion of the work platform with wood inserts removed.
Figure 5:
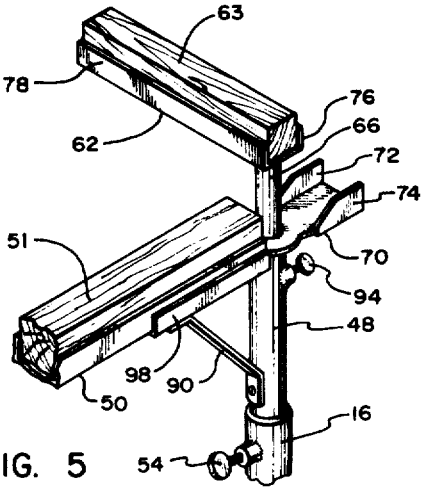
FIG. 5 is a fragmentary schematic perspective illustration of one portion of the work platform of this invention in transition from one position to another.

The lateral dimension of the arms 60 and 62 is substantially the same as the lateral dimension of cross channel 53. Accordingly, the arms 60 and 62 will not nest within the cross channel 53 even when the wood insert 51 (FIG. 5) has been removed. However, it is observed that the laterally extending support elements 68 and 70 are slightly larger in width than the lateral dimension of the arms 60 and 62. Accordingly, as shown at the right side of FIG. 2 each arm will nest securely between the upstanding sides 72 and 74 of the corresponding support element. It is also observed that the open space at the intermediate portion 55 will receive arms 60 or 62 at right angles generally as shown in FIGS. 3 and 4. The upstanding sides of the brackets 96 and 98 will continuously maintain the arms 60 and 62 in either the laterally projecting position illustrated at the right side of FIG. 2 or the essentially right angle orientation as illustrated in FIGS. 3 and 4. The thumb screw 92 or 94 will prevent vertical extension of the arm except when desired for movement into a selected position as shown in FIG. 5.

Both of the arms 60 and 62 have corresponding wood inserts 61 and 63 which have substantially the same cross section as the insert 51 (see FIG. 3). The length of the wood inserts 61 and 63 is selected to be substantially identical to the length of the arms 60 and 62.

Each of the inserts 51, 61 and 63 are replaceable within their corresponding channel elements. Referring particularly to FIG. 4, it is pointed out that cross channel 53 is provided with a plurality of elongated slots 84 at spaced locations along its entire length, only one slot being illustrated in FIG. 4. The elongated slots 84 permit wood screws (not shown) to threadedly engage and secure the insert 51 when the insert is nested within the channel 53. Arm 62, as shown in FIG. 4, is also provided with elongated slots 85 and 86 similarly adapted to receive wood screws (not shown) to secure insert 63 between the upper right sides 76 and 78 of the arm 62. While a specific illustration of the securement of the insert 61 to the arm 60 is not illustrated, it is understood that the insert 61 is similarly secured to the arm 60.

The advantage of the mentioned securement is that the inserts may be easily removed by simply removing the corresponding screws and lifting the insert from its corresponding channel member. Thus, damaged inserts can be simply and quickly replaced with little waste of material and time.

The mode of operation of the work platform 10 will now be described. For transport and storage, the platform 10 is preferably folded as illustrated in FIG. 1. In this folded configuration, the platform is essentially planar and because of its lightweight construction can be easily moved from place to place and stored with little difficulty. In order to properly use the platform, transverse stability is afforded when the support stand is rotated about the longitudinal axis of the neck 26 within the sleeve 28. Rotation is accommodated by loosening the set screw 30 and manually twisting the support stand 20 into position. While the support stand 20 is illustrated at an essentially right angle orientation with respect to cross piece 18, it should be appreciated that any reasonable orientation of the support stand 20 may be used as long as it gives the desired stability. On sloping or uneven terrain, the neck 26 may be extended from within the sleeve 28 to assure that at least three of the feet 22, 24, 38 and 40 solidly engage the ground.

Figure 2:
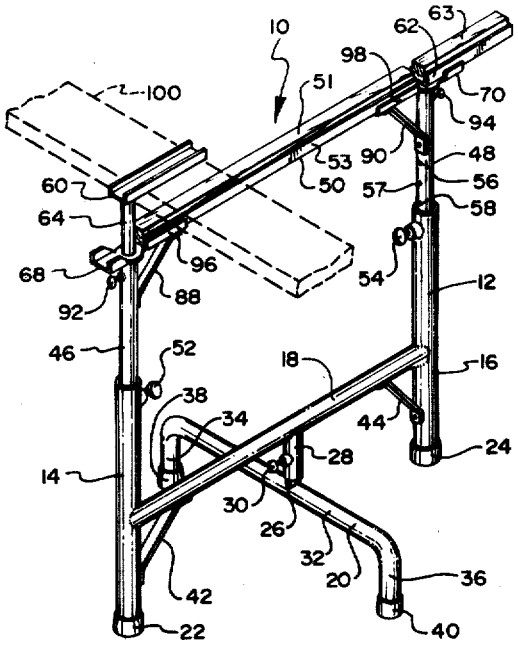
FIG. 2 is a perspective illustration of the work platform of this invention in one operative position, a workpiece illustrated in broken lines being clamped thereon.
Figure 3:
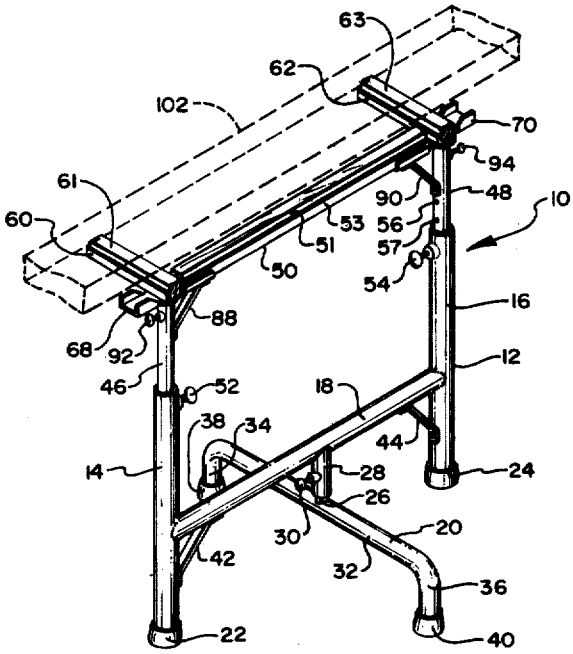
FIG. 3 is a perspective illustration of the work platform of this invention in another operative position with a workpiece illustrated thereon in broken lines.

The normal operational position of the work platform 10 is to place the arms 60 and 62 in outwardly projecting positions as shown at the right side of FIG. 2 or, alternatively, in the right angle positions as illustrated in FIG. 3. To position the arms in the described orientation from the folded position illustrated in FIG. 1, thumb screws 92 and 94 are loosened to permit extension of the arms as shown in FIG. 5 and, simultaneously, to permit rotation of the arms into either the illustrated right angle position (FIG. 3) or the coextensive position (the right hand side of FIG. 2). It is noted that the described structure permits rotation of the arms 60 and 62 through 360°, if desired. When the arm has been oriented according to the desired position, the shaft 66 is telescoped into the tube 48 and the thumb screw 94 tightened to hold the position of the arm 62. The bracket 98 including upstanding sides 72 and 74 will prevent inadvertent rotation about the axis of shaft 66 even if the thumb screw 94 should fail to hold the arm 62 in position.

The work platform may be used in a variety of ways to support a workpiece. For example, as shown in FIG. 2, a workpiece 100 may be placed upon the upper work surface of insert 51 and held tightly in place by first extending the arm 60 from within the tube 46, then rotating the arm 60 so as to be superimposed over the workpiece 100 and thereafter lowering the arm 60 into tight engagement with the workpiece 100. If desired, tightening of the thumb screw 92 will assist to hold the workpiece 100, the arm 60 and the work surface provided by insert 51 forming a clamp to hold the workpiece 100. As shown in FIG. 3, the workpiece may be placed upon the arms 60 and 62 located at essentially a right angle to thereby present a generally flat work surface defined by the wood inserts 61, 51 and 63. It has also been found desirable to use the work platform 10 in tandem with another similar work platform in the same general way in which saw horses have heretofore been used.

In the course of continued use of the work platform 10, it is likely that the wood inserts 51, 61 and 63 will become damaged as tools are used on the workpieces 100 and 102. As shown in FIG. 4, however, the damaged inserts 51, 61 and 63 can be easily replaced with corresponding inserts by simply removing the screws passing through slots 84–86, removing the old damaged inserts and replacing with substitute, undamaged wood inserts.

The invention may be embodied in other specific forms without departing from its spirit or essential characteristics. The described embodiments are to be considered in all respects only as illustrative and not restrictive and the scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A foldable work platform comprising in combination:

a base comprising two upright, hollow legs rigidly interconnected by a cross piece and a support stand rotatably attached to the cross piece for selectively giving stability to the base when in upright position;

a scaffold adjustably cooperating with the base and comprising two downwardly depending hollow members rigidly interconnected by an open cross channel, each member being telescopically received by a leg, and means for securing each leg and hollow member together;

an arm configurated as an open U-shaped channel rotatably and extensibly carried upon the scaffold at at least one end thereof; and wooden inserts nested within the cross channel and arms, the inserts extending above the sides of the channels.

2. A foldable work platform as defined in claim 1 wherein said support stand is vertically extensible to give stability to the base on uneven terrain.

3. A foldable work platform as defined in claim 1 wherein said wooden inserts are removably mounted upon the cross channel.

4. A foldable work platform as defined in claim 1 wherein said wooden inserts are removably mounted upon the arm.

5. A foldable work platform as defined in claim 1 wherein said means for securing each leg and hollow members together comprises means for positively interlocking the leg and hollow member.

6. A foldable work platform as defined in claim 1 wherein said scaffold comprises laterally extending support means for receiving the arms in nesting relationship in at least two orientations in which lateral displacement of the arm is limited.

* * * * *